Patented Aug. 31, 1926.

1,598,039

UNITED STATES PATENT OFFICE.

LOUIS L. BENTLEY, OF BEAVER FALLS, PENNSYLVANIA, ASSIGNOR TO ARMSTRONG CORK COMPANY, OF PITTSBURGH, PENNSYLVANIA, A CORPORATION OF PENNSYLVANIA.

CORK BOARD AND THE MANUFACTURE THEREOF.

No Drawing. Application filed December 15, 1920, Serial No. 431,043. Renewed November 23, 1925.

My invention relates to cork-board and to the manufacture thereof, and is designed to produce a cork-board which possesses a relatively high degree of structural strength and also relatively high resistance to heat conductivity. A further object of the invention is to provide a novel method of manufacturing cork-board in accordance with which a highly effective binder is produced in situ within the body of cork during the manufacture, and which method may be carried out more rapidly than has heretofore been possible, by reason of the fact that the amount of external heat necessary to the carrying out of the process is either greatly reduced, or the use of external heat is entirely eliminated.

It has long been known that cork contains substances that are capable of being utilized as a binding agent for cork particles, and numerous attempts have been made to utilize such substances as a binding agent. In corkboard such as described and claimed in my Patent No. 1,184,308, dated May 23, 1916, such substances are used as the only binder for the cork particles.

I have now discovered a novel method whereby the substances contained within the cork may be utilized in a much more complete and highly effective manner than has heretofore been possible, thereby producing a cork-board of greatly superior quality.

In accordance with my present invention, the cork particles are mixed with some substance which is capable of generating heat within the mass of such particles, this heat being utilized in the expansion of the cork and also in the production of the binder. A number of different substances may be mixed with the cork for this purpose, such as calcium carbide, calcium oxide, potassium oxide, magnesium oxide, sodium oxide, etc. These substances all have the property of being able to combine with the moisture present in the cork to produce a relatively high temperature in the mass. I preferably employ calcium carbide, since this has the greatest heat formation with water, and also because I have found that the acetylene gas liberated by the decomposition of the calcium carbide appears to have an important hardening action upon the binding substances produced by the partial distillation of the cork.

In carrying out my invention, the calcium carbide is preferably reduced to a finely divided or pulverized state, and is mixed with the cork in such a manner as to coat the surfaces of the cork as completely and uniformly as possible with particles of the carbide. Apparently the finer the pulverization of the carbide, the more complete is the coating of the particles therewith, and the better the results obtained. The particles of cork so coated are then placed in a closed mold in substantially the same manner as heretofore practiced in the manufacture of cork-board. The decomposition of the calcium carbide immediately begins, with the attendant generation of heat within the confined mass, this heat being sufficient to partially distill the cork and cause distillation products to be formed on the surface of the cork particles. Reactions occur between these distillation products and the products of decomposition of the calcium carbide. I am not at the present time able to state just what these reactions are, but I believe that the distillation products are saponified by the action of the calcium hydrate formed by the decomposition of the calcium carbide. I also find that the amount of free acetylene gas which is given off is very materially less than the total volume of gas which should be generated under the conditions of the operation; and I believe that a reaction occurs between the acetylene gas and the distillation products of such a nature that the latter are materially hardened. In any event, the result is to change the distillation products in a manner to form a very efficient binder, these products being largely produced on the surface of the cork particles where the intensity of the reaction is greatest so that a strong and intimate bond is formed between the particles.

It is well known that a cork-board product, in order to possess maximum heat insulation properties, should be free from air spaces or voids between adjacent particles. Heretofore it has been attempted to obtain the absence of such voids in so far as possible by a maximum expansion of the cork particles, as described in my said patent. Manifestly, however, in such process some voids will remain. By the present process these voids are much fewer in number and smaller in size, and in addition the cork particles are covered with a very thin but continuous coating of the binding material which effectually seals the cork particles and reduces the air seepage to practically nil. The presence of these products can be very clearly seen in the spaces between the cork particles, the products having a tarry appearance.

The amount of calcium carbide, or its equivalent, which it is necessary to use in any particular case, is largely dependent upon the amount of moisture contained in the cork. The higher the amount of moisture contained, the higher the amount of carbide which should be used. The cork, however, should not possess too high a degree of moisture, because in such cases such an amount of carbide must be used that the hydrate of lime resulting from its decomposition will form a coating on the cork particles to such an extent as to interfere with their proper bonding. On the other hand, the amount of moisture present in the cork should not be too low, or there will not be sufficient heat generated by the decomposition of the calcium carbide to produce the desired result. I have obtained the best results with a moisture content in the cork of about 10% by weight; and in that case I used about 5% by weight of calcium carbide. It will be understood, however, that I have not limited myself to these proportions. Preferably in each case the amount of moisture contained in the cork should be predetermined, and the amount of calcium carbide used proportioned accordingly. If the cork contains too much moisture, it may be partially dried before mixing the carbide therewith. On the other hand, if the cork is too dry, it may be sprayed or steamed until the proper result is attained.

Owing to the relatively high degree of heat generated within the cork mass by the decomposition of the calcium carbide, a satisfactory product can be produced in much less time than has heretofore been possible by the old process of baking the cork in molds in an oven; since in such process considerable time is required for the heat to properly penetrate throughout the entire mass. By the process of my present invention, if the molds are properly heat insulated to prevent the escape of heat from the surface portions of the cork mixture, the process can be carried out without the application of any external heat. I prefer, however, to place the molds containing the cork mixture in an oven which may be heated to any temperature below that at which the cork will be injured.

The practice of my invention results in a greatly superior article of manufacture; and the time required for the manufacture is greatly reduced, thus largely increasing the output of any given plant, as well as the cost of fuel required for a given output. The time required can be further reduced by preheating the cork before mixing the carbide therewith, but the preheating should be carried out under conditions which will prevent too great evaporation of the contained moisture.

By the term "cork-board" as used herein and in the claims, I intend to cover, not only boards of this material, but also slabs, blocks, bricks, and other shapes thereof.

I claim:

1. A new article of manufacture, comprising a mass of cork particles bonded together by saponified distillation products of cork, substantially as described.

2. A new article of manufacture, comprising a mass of cork particles bonded together by saponified and hardened distillation products of cork, substantially as described.

3. A new article of manufacture, comprising a mass of cork particles bonded together by saponified distillation products of cork produced in situ in the cork mass, substantially as described.

4. A new article of manufacture, comprising a mass of cork particles bonded together by saponified and hardened distillation products of cork and produced in situ in the cork mass, substantially as described.

5. As a new article of manufacture, a mass of cork particles bonded together by reaction products formed by the partial distillation of cork in the presence of a compound which when hydrated by the action of the moisture in the cork yields an alkali, substantially as described.

6. As a new article of manufacture, a mass of cork particles bonded together by reaction products formed in situ by the partial distillation of cork in the presence of a compound which when hydrated by the action of the moisture in the cork yields an alkali, substantially as described.

7. As a new article of manufacture, a mass of cork particles bonded together by reaction products formed by the partial distillation of cork in the presence of a compound which when hydrated by the action of the moisture in the cork yields an alkali and also a gas capable of exerting a hardening effect upon the distillation products, substantially as described.

8. The herein described method of making cork-board which consists in mixing the cork particles with a hygroscopic compound which will yield an alkali when hydrated by the moisture in the cork, and utilizing the heat generated by the reaction to effect the bonding of the cork particles, substantially as described.

9. The herein described method of making cork-board which consists in mixing the cork particles with a hygroscopic compound which will produce an alkali when hydrated by the moisture in the cork, and confining the mixture in a receptacle during the action of hydration, substantially as described.

10. The herein described method of making cork-board which consists in mixing the cork particles with a hygroscopic compound which when hydrated will yield an alkali and also a gas, said alkali and gas being caused to react upon the distillation products of the cork produced in situ by the action of hydration, substantially as described.

11. The herein described method of making cork-board which consists in mixing the cork particles with a substance which will unite with the moisture of the cork to produce heat and yield an alkali, substantially as described.

12. The herein described method of making cork-board which consists in mixing cork particles with calcium carbide and confining the mixture during the reaction between the carbide and the moisture contained in the cork, substantially as described.

13. The herein described method of making cork-board which consists in mixing cork particles with calcium carbide and confining the mixture during the reaction between the carbide and the moisture contained in the cork, and also applying external heat to the mixture during such reaction, substantially as described.

14. The herein described method of making cork-board which consists in coating cork particles with pulverized calcium carbide, and utilizing the heat generated by the reaction of the moisture contained in the cork upon the calcium carbide to effect an expansion and bonding of the cork particles, substantially as described.

15. In the manufacture of cork-board, the step which consists in mixing granulated cork with a substance which has an exothermic reaction therewith, substantially as described.

16. In the manufacture of cork-board, the step which consists in mixing granulated cork with a substance which has an exothermic reaction therewith, shaping the mixture, and utilizing the heat of reaction to effect a bonding of the cork particles, substantially as described.

17. In the manufacture of cork-board, the step which consists in mixing granulated cork with a substance which has an exothermic reaction therewith and utilizing the heat of reaction to effect a partial distillation of the cork, substantially as described.

18. In the manufacture of articles from granulated cork, the step which consists in generating heat internally of a mass of cork particles, substantially as described.

19. In the manufacture of articles from granulated cork, the step which consists in causing exothermic chemical reaction throughout a mass of such particles, substantially as described.

20. In the manufacture of articles from granulated cork, the steps which consists in generating heat internally of a mass of cork particles, and simultaneously therewith applying external heat, substantially as described.

21. As a new article of manufacture, a mass of cork particles bonded by reaction products formed by the partial distillation of cork in the presence of a compound which when acted on by the moisture present in the cork yields a gas capable of exerting a hardening effect upon the distillation products, substantially as described.

22. A new article of manufacture comprising a mass of cork particles united by a binder derived from and hardened by distillation products of cork, substantially as described.

23. A new article of manufacture comprising a mass of cork particles united by a binder derived from and hardened by distillation products of cork produced in situ, substantially as described.

24. A new article of manufacture comprising a mass of cork particles bonded together by saponified distillation products produced by the internal generation of heat within the mass in the presence of a saponifying agent, substantially as described.

25. A new article of manufacture comprising a mass of cork particles united by a binder derived from and hardened by saponified distillation products of cork, substantially as described.

26. A new article of manufacture comprising a mass of cork particles united by a binder derived from and hardened by saponified distillation products of cork produced in situ, substantially as described.

27. The herein described method of making cork-board which comprises mixing the cork particles with a compound capable of generating heat when acted on by the moisture of the cork particles and causing a partial distillation of the cork, substantially as described.

28. The herein described method of making cork-board which comprises mixing the cork particles with a compound capable of generating heat in situ when acted on by the moisture in the cork and causing a partial distillation of the cork, substantially as described.

In testimony whereof, I have hereunto set my hand.

LOUIS L. BENTLEY.